United States Patent [19]

Müller

[11] 4,254,915

[45] Mar. 10, 1981

[54] FUEL INJECTOR FOR INTERNAL COMBUSTION ENGINES

[75] Inventor: Eckart Müller, Schwabach, Fed. Rep. of Germany

[73] Assignee: Maschinenfabrik Augsburg-Nürnberg Aktiengesellschaft, Nuremberg, Fed. Rep. of Germany

[21] Appl. No.: 960,831

[22] Filed: Nov. 15, 1978

[30] Foreign Application Priority Data

Nov. 15, 1977 [DE]  Fed. Rep. of Germany ....... 2750929

[51] Int. Cl.³ .................... B05B 1/30; F02M 61/00
[52] U.S. Cl. .................................... 239/533.12
[58] Field of Search ................ 239/453, 533.3–533.12

[56] References Cited

U.S. PATENT DOCUMENTS

| | | | |
|---|---|---|---|
| 2,017,028 | 10/1935 | Heinrich et al. | 239/453 |
| 3,559,892 | 2/1971 | Luca | 239/533.4 |

FOREIGN PATENT DOCUMENTS

| | | | |
|---|---|---|---|
| 1197303 | 11/1959 | France | 239/533.12 |
| 738769 | 10/1955 | United Kingdom | 239/533.4 |

*Primary Examiner*—Johnny D. Cherry
*Attorney, Agent, or Firm*—Becker & Becker, Inc.

[57] ABSTRACT

A fuel injector for internal combustion engines. The fuel injector comprises a nozzle needle which is axially displaceably arranged in a nozzle body and is adapted to be lifted off its conical valve seat in response to fuel pressure. A pin of the nozzle needle extends below the valve seat into a cavity provided in the nozzle body. In the nozzle body, below the cavity, there is provided a blind hole having a diameter smaller than that of the cavity. The pin extends into this blind hole when the fuel injector is closed or slightly opened, providing substantial sealing in a radial direction. At least one spray hole enters the blind hole eccentrically in such a way that a clearance is formed which communicates with the cavity.

10 Claims, 7 Drawing Figures

INCLINED SPRAY HOLE

PARALLEL SPRAY HOLE

FUEL INJECTOR FOR INTERNAL COMBUSTION ENGINES

The present invention relates to a fuel injector for internal combustion engines. The fuel injector includes a nozzle needle which is axially displaceably mounted in a nozzle body and is adapted to be lifted off its conical valve seat by the pressure of the fuel. A pin of the nozzle needle extends below its valve seat into a cavity provided in the nozzle body.

With one heretofore known injector of this type, the nozzle is a genuine pin nozzle, in other words, the pin, which extends into the cavity, also passes through the nozzle bore which is invariably centrally arranged. The pin opens this nozzle bore to a greater or lesser extent depending upon the existing fuel injection pressure. The objective is to obtain controlled preinjection of the fuel by holding the nozzle needle on its valve seat by means of two springs which have different characteristics and/or become operative at different times. The spray direction in all positions of the nozzle needle is always in the direction of the longitudinal axis of the nozzle needle.

It is well known that the quality of the fuel injection in the case of direct-injection internal combustion engines depends essentially on the injection pressure existing directly at the spray hole of the nozzle.

Further essential criteria for the quality of the mixture formation in the combustion chamber of an internal combustion engine are the fuel spray orientation and the spray characteristic. It has been known for a long time that it is very advantageous to mix a relatively large proportion of the fuel directly with the air during starting and in the lower load and/or speed ranges of the engine. This mixing is obtainable by a wider spray angle and by directing the fuel spray directly into the air for combustion, whereas a compact fuel spray directed more in the direction of the wall of the combustion chamber is desirable in the upper load and/or speed ranges in order to avoid detrimental peak pressures occurring as a result of combustion proceeding at too fast a rate. This applies especially to internal combustion engines which employ the process of wall deposition of the fuel, where a change in the direction of the fuel spray is very advantageous.

With a view to satisfying these requirements, a number of proposals have been made, all of which suffer from some drawbacks. For instance, an apparatus is known for deflecting the fuel spray, according to which a temperature-responsive deflector is provided in the region of the fuel spray. This deflector consists of a bimetallic or similar device, and deflects the fuel towards the middle of the combustion chamber when the combustion chamber is cold; when the combustion chamber is hot, the fuel spray is directed against the wall. This apparatus is based solely on temperature-responsive action, while spray characteristics and the injection pressure are not taken into consideration. Moreover, it is highly susceptible to disruption.

There have been other proposals, such as rotating the nozzle during different load ranges of the engine. However, because of their complexity, these proposals have not been widely accepted.

This is the starting point of the present invention, the object of which is to improve a fuel injector of the type described above in a simple manner without using means which are susceptible to disruption, and to improve the injector in such a way that the fuel pressure is available substantially undiminished at the spray hole throughout the entire injection phase and that the fuel spray characteristic and orientation are automatically varied, by the respective position of the nozzle needle, over the full operating range or over part of this range of an engine in a manner that efficient mixture formation is achieved; in this connection, the spray direction, with the nozzle fully open, need not necessarily be in the direction of the longitudinal axis of the nozzle.

This object, and other objects and advantages of the present invention, will appear more clearly from the following specification in connection with the accompanying drawings, in which.

Figure 1:
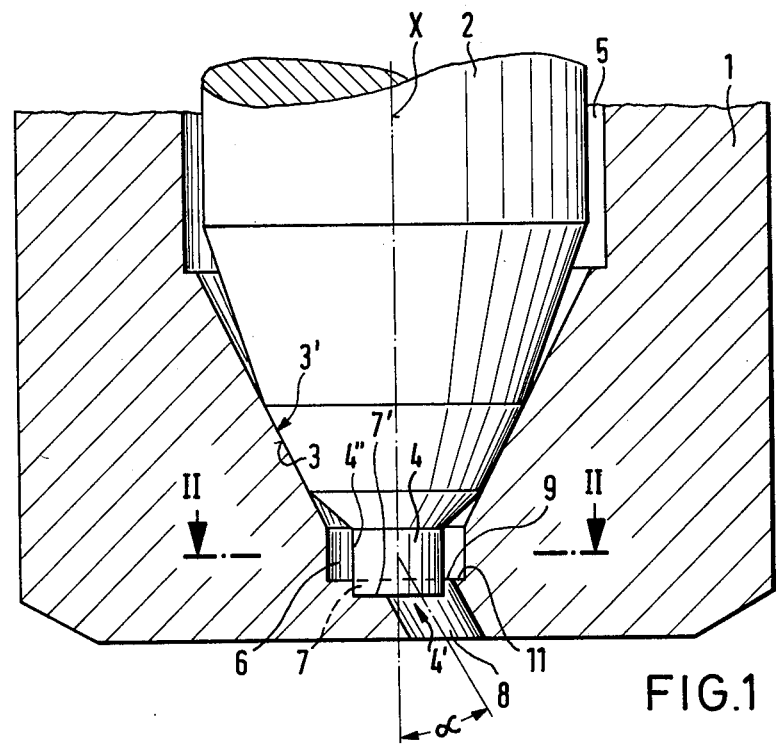
FIG. 1 is a longitudinal section through the lower part of an injector according to the present invention.

The fuel injector of the present invention is characterized primarily by providing in the nozzle body, below the cavity, a blind hole having a smaller diameter into which the pin extends when the nozzle needle is closed or slightly opened, providing substantial sealing in a radial direction. The present invention is further characterized in that at least one spray hole enters the blind hole eccentrically in such a way that a clearance is formed which communicates with the cavity.

With such a configuration, when the nozzle needle is lifted slightly off its valve seat, fuel passes through the clearance into the spray hole, where it produces an atomizing spray which, depending on the direction, the diameter, and the length of the spray hole, has a greater or lesser angle of spread and extends in a definite direction. The direction of the atomizing spray is controlled by the orientation of that side of the spray hole which faces the clearance, this side forming one boundary line. The other boundary for the formation of the atomizing spray is the lower edge of the opposite side of the spray hole. The shorter this side is, the wider will be the spray. With the nozzle needle fully open, the pin is retracted completely from the blind hole and its bottom end is far enough above the blind hole to produce a compact spray in the spray hole, which spray extends in the direction of the spray hole. The objective of the invention is thus fully met.

Pursuant to a further feature of the present invention, it is proposed that the pin be cylindrical, with its free end face and the bottom of the blind hole forming planar surfaces. Depending on the installation conditions of the injector, the spray hole may be parallel, yet eccentric, to the longitudinal axis of the injector, or may be at an angle thereto. In most cases, it will be expedient to have the spray hole clearance, which communicates with the cavity, located at that side of the spray hole which is positioned in the direction of the orientation of the spray hole, because this will enable the maximum deflection of the fuel spray to be produced.

According to the present invention, the interface between the blind hole and the cavity should be parallel to the bottom of the blind hole and/or the planar end face of the pin to permit simpler manufacture. However, it is also within the scope of the present invention to have this interface arranged obliquely to the bottom of the blind hole, and in particular, in such a way that the blind hole has its least depth at that side which faces the clearance. This produces a gradual transition between the spray orientation and spray characteristics during slight lift of the nozzle needle to those during great lift. Furthermore, it is within the scope of this invention, if the interface is conical in the direction toward the blind hole, as a result of which simpler manufacture and more favorable flow conditions are obtained.

Referring now to the drawings in detail, a nozzle needle 2 is axially displaceably mounted in the lower part of the nozzle body 1. At its lower end, the nozzle needle 2 has a conical valve seat 3 and a cylindrical pin 4 with a planar free end face 4'. A free space 5 for the fuel supply is located between the nozzle body 1 and the nozzle needle 2. Below the valve seat 3', the free space 5 communicates with a cylindrical cavity 6 and ends in a blind hole 7 having a flat bottom 7'. Communicating with the blind hole 7 is a spray hole 8 which is disposed eccentrically thereto in such a way that a clearance 9 always communicates directly with the cavity 6. In addition, a planar interface 11 is provided between the cavity 6 and the blind hole 7.

As shown in FIG. 1, the spray hole 8 extends at an angle obliquely to the longitudinal axis x of the injector. The nozzle needle 2 is shown in a closed position, with the pin 4 penetrating the cavity 6, its surface 4" extending into the blind hole 7, forming a substantial seal therewith.

Figure 2:
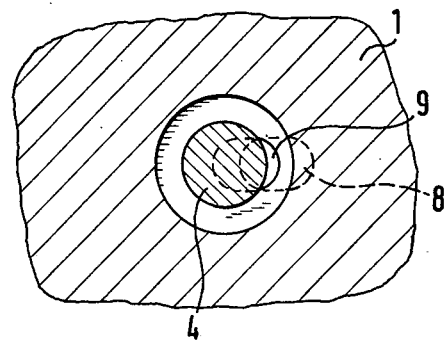
FIG. 2 is a section taken along the line II—II of the injector of FIG. 1.

FIG. 2 essentially shows merely the shape of the clearance 9 of the spray hole 8, which clearance 9 communicates with the cavity 6.

Figure 3:
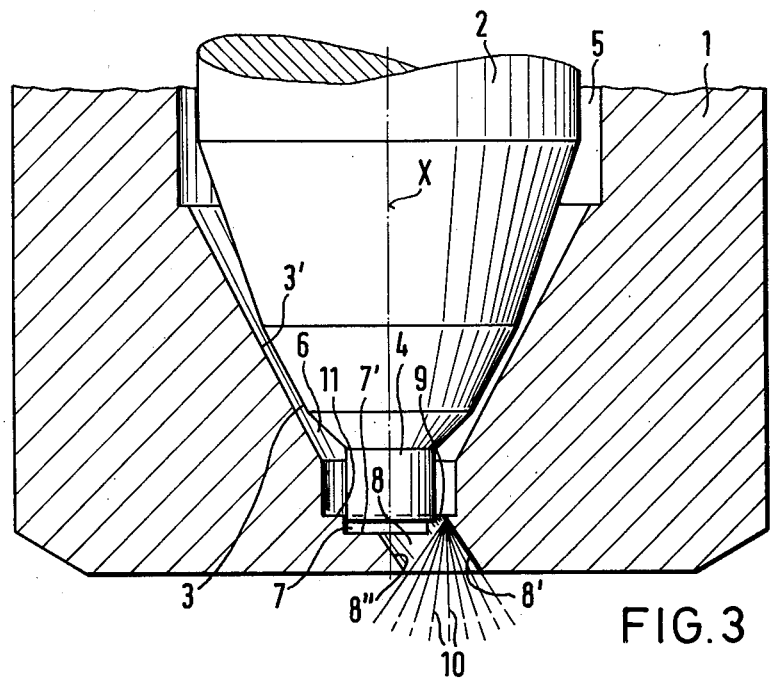
FIG. 3 shows the injector of FIG. 1 with the nozzle needle in a partly opened position.

As shown in FIG. 3, the nozzle needle 2 is slightly lifted off the valve seat 3', while the pin 4 has not yet been fully withdrawn from the blind hole 7. Through the open valve seat 3, 3', the fuel now passes into the cavity 6, from where it is throttled through clearance 9 in the form of an atomizing spray 10 and is injected into the cylinder of the internal combustion engine. The shape of the atomizing spray 10 is predominantly determined on the one hand by the side 8' which adjoins the clearance 9, and on the other hand by the lower edge of that side 8" of the spray hole 8 which is opposite to side 8'. It can be clearly seen that the center of the atomizing spray 10 is in this case approximately parallel to the longitudinal axis x of the injector. With the nozzle needle 2 fully open, the pin 4 uncovers the full cross-sectional area of the spray hole 8, and a compact fuel spray is produced which is oriented at angle α to the longitudinal axis x.

Figure 4:
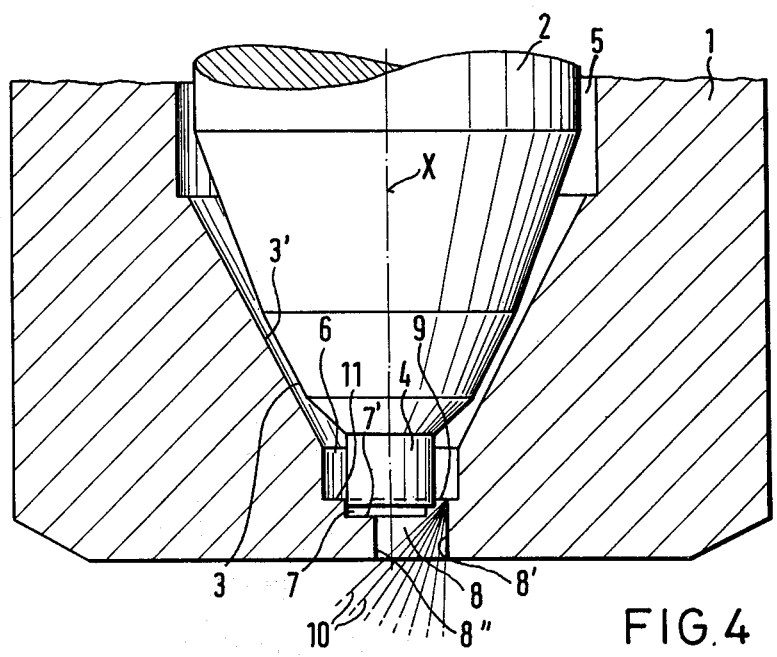
FIG. 4 is a variation of the injector of FIG. 3.

FIG. 4 shows the nozzle needle 2 in the same position as in FIG. 3, except that the spray hole 8 is disposed eccentrically, yet parallel, to the longitudinal axis x of the injector. In this case, the center of the atomizing spray 10 is no longer approximately parallel to the longitudinal axis x, but is directed towards it. This clearly shows that already by the shape and location of the spray hole alone, it is possible to match any desired installation condition without any major modification.

Figure 5:
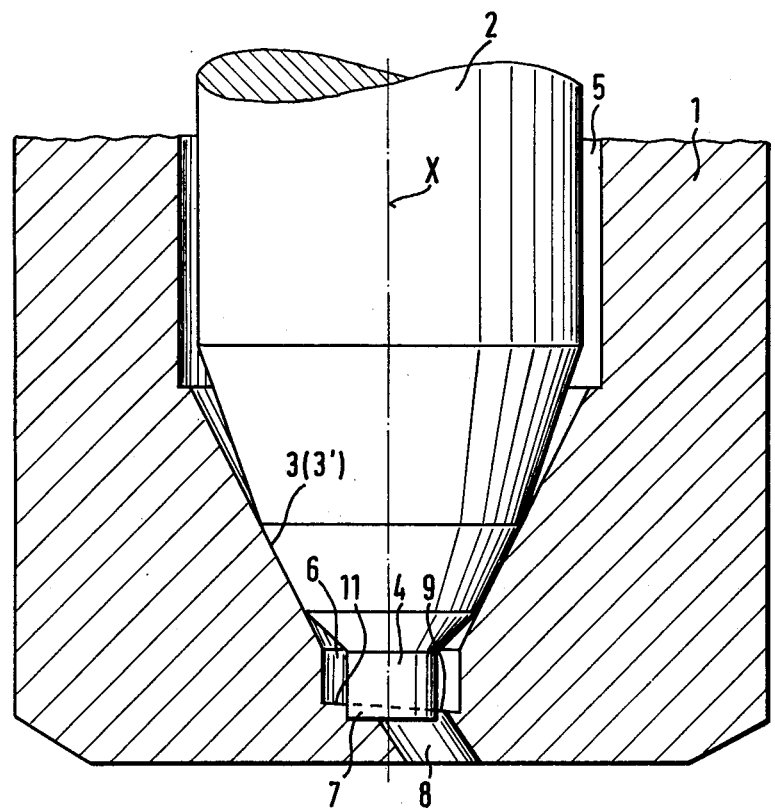
FIG. 5 is a variation of the injector of FIG. 1.

FIG. 5 shows an injector similar to that of FIG. 1, with the nozzle needle 2 also in a closed position. The only differentiating feature is the interface 11, which is disposed obliquely in such a way that the blind hole 7 has its least depth in the region of the clearance 9. This causes a gradual transition of the spray direction and spray characteristic from a slight lift of the nozzle needle 2 to a great lift.

Figure 6:
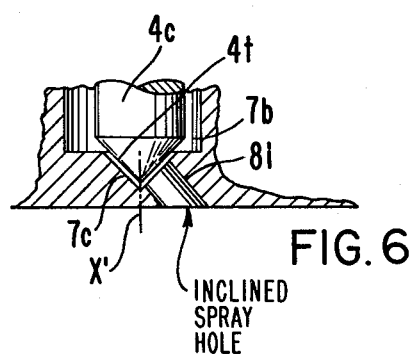
FIG. 6 shows a cylindrical pin having a conical tip and having a conical base as a blind hole including an inclined spray hole therewith.

FIG. 6 shows a cylindrical pin 4c having a conical tip 4t and a conical base 7c of a blind hole 7b including an inclined spray hole 8i slanted as to axis x' of the nozzle body therewith.

Figure 6A:
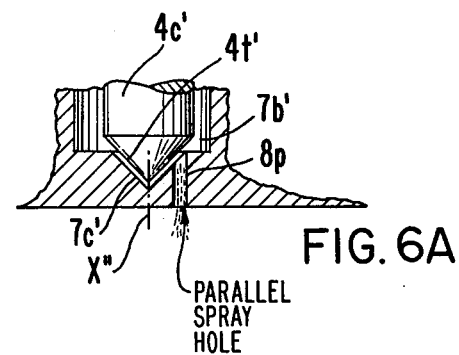
FIG. 6A shows a cylindrical pin having a conical tip and having a conical base and a spray hole which is parallel to the longitudinal axis of the nozzle body therewith.

FIG. 6A shows a cylindrical pin 4c' having a conical tip 4t' and a conical base 7c' of a blind hole 7b' including a spray hole 8p therewith which is parallel to the longitudinal axis x" of the nozzle body.

The present invention is, of course, in no way restricted to the disclosure of the drawings, but also encompasses any modifications within the scope of the appended claims.

What I claim is:

1. A fuel injector for internal combustion engines, which comprises:

a nozzle body having a valve seat, a cavity which is substantially coaxial to the longitudinal axis of said nozzle body, a blind hole located at the base of and substantially coaxial with said cavity and having a smaller diameter than said cavity, and at least one spray hole which communicates with said blind hole and is also adapted to communicate with the combustion chamber of a cylinder of said engine, said at least one spray hole being eccentrically located in said nozzle body, relative to the longitudinal axis thereof, in such a way that a small portion of said spray hole, in the form of a clearance, also communicates with said cavity;

a nozzle needle which is axially displaceably arranged within said nozzle body and is provided with a conical valve seat which is adapted to rest against said valve seat of said nozzle body in a closed position of said fuel injector and is further adapted to be lifted off said valve seat of said nozzle body, in response to fuel pressure, into an opened position of said fuel injector; and a pin forming a part of said nozzle needle and located on that side of said conical valve seat thereof which faces said cavity, said pin extending into said cavity and said blind hole when said fuel injector is in the closed and slightly opened positions to provide substantial sealing in a radial direction, said at least one spray hole being parallel, yet still eccentric, to the longitudinal axis of said nozzle body.

2. A fuel injector according to claim 1, in which the length of said at least one spray hole is selected in conformity with the predetermined fuel spray angle caused by the clearance when said fuel injector is in the slightly opened position.

3. A fuel injector according to claim 1, in which said pin is cylindrical and has a planar free end face, and in which the base of said blind hole is also planar.

4. A fuel injector according to claim 1, in which the interface between said blind hole and said cavity, resulting from the configuration of said blind hole, is conical in the direction towards said blind hole.

5. A fuel injector according to claim 1, in which said pin is cylindrical and has a conical tip, and in which the base of said blind hole is conical.

6. A fuel injector for internal combustion engines, which comprises:

a nozzle body having a valve seat, a cavity which is substantially coaxial to the longitudinal axis of said nozzle body, a blind hole located at the base of and substantially coaxial with said cavity and having a smaller diameter than said cavity, and at least one spray hole which communicates with said blind hole and is also adapted to communicate with the combustion chamber of a cylinder of said engine, said at least one spray hole being eccentrically located in said nozzle body, relative to the longitudinal axis thereof, in such a way that a small portion of said spray hole, in the form of a clearance, also communicates with said cavity;

a nozzle needle which is axially displaceably arranged within said nozzle body and is provided with a conical valve seat which is adapted to rest against said valve seat of said nozzle body in a closed position of said fuel injector and is further adapted to be lifted off said valve seat of said nozzle body, in response to fuel pressure, into an opened position of said fuel injector; and a pin forming a part of said nozzle needle and located on that side of said conical valve seat thereof which faces said cavity, said pin extending into said cavity and said blind hole when said fuel injector is in the closed and slightly opened positions to provide substantial sealing in a radial direction, said pin being cylindrical and having a planar free end face, and in which the base of said blind hole is also planar, the interface between said blind hole and said cavity resulting from the smaller diameter of said blind hole being parallel to the base of said blind hole and to the planar end face of said pin.

7. A fuel injector for internal combustion engines, which comprises:

a nozzle body having a valve seat, a cavity which is substantially coaxial to the longitudinal axis of said nozzle body, a blind hole located at the base of and substantially coaxial with said cavity and having a smaller diameter than said cavity, and at least one spray hole which communicates with said blind hole and is also adapted to communicate with the combustion chamber of a cylinder of said engine, said at least one spray hole being eccentrically located in said nozzle body, relative to the longitudinal axis thereof, in such a way that a small portion of said spray hole, in the form of a clearance, also communicates with said cavity;

a nozzle needle which is axially displaceably arranged within said nozzle body and is provided with a conical valve seat which is adapted to rest against said valve seat of said nozzle body in a closed position of said fuel injector and is further adapted to be lifted off said valve seat of said nozzle body, in response to fuel pressure, into an opened position of said fuel injector; and a pin forming a part of said nozzle needle and located on that side of said conical valve seat thereof which faces said cavity, said pin extending into said cavity and said blind hole when said fuel injector is in the closed and slightly opened positions to provide substantial sealing in a radial direction, said pin being cylindrical and having a planar free end face, and in which the base of said blind hole is also planar, the interface between said blind hole and said cavity resulting from the smaller diameter of said blind hole being oblique to the base of said blind hole and to the planar end face of said pin.

8. A fuel injector according to claim 7, in which said spray hole is disposed at an angle relative to the longitudinal axis of said nozzle body.

9. A fuel injector according to claim 8, in which said form of clearance of said spray hole is located on that side of said spray hole which is furthest from the longitudinal axis of said nozzle body.

10. A fuel injector according to claim 7, in which said oblique interface is oriented in such a way that said blind hole has its least depth on that side thereof which is closest to said clearance.

* * * * *